United States Patent Office 3,245,453
Patented Apr. 12, 1966

3,245,453
COMPOSITIONS CONTAINING SYNTHETIC RUBBER, ASPHALT, AND HYDROUS MAGNESIUM SILICATE
Bernard C. Barton, Kinnelon, Hendrik K. J. de Decker, Montclair, and Lewis Bsharah, Morris Plains, N.J., assignors to Texas-U.S. Chemical Company, Parsippany, N.J., a corporation of Delaware
No Drawing. Filed Feb. 20, 1963, Ser. No. 260,049
12 Claims. (Cl. 152—330)

The present invention relates to a synthetic rubber having improved air retention characteristics which is particularly useful in the manufacture of tubeless tires and inner tubes for tires.

Synthetic rubbers of the styrene-butadiene type, commonly referred to as SBR rubbers, have poor air retention characteristics, i.e., air diffuses into and through the rubber. This limits the use of those rubbers for such purposes as inner tubes, tubeless tires, rubber air tanks, etc. Diffusion of air into the rubber also increases the problems associated with oxygen and ozone degradation. It is currently the practice in the rubber industry to use butyl rubber when good air retention qualities are desired. Butyl rubber, while being less permeable to air, however, has the disadvantage of being more expensive than SBR rubbers.

It is an object of this invention to provide rubbers produced from styrene-butadiene copolymers having good air retention characteristics.

We discovered that styrene-butadiene rubbers incorporating fine laminar particles of hydrous magnesium silicate together with a solid asphalt have good air retention properties. These magnesium silicate particles are used in an amount between 40 and 140 parts, and preferably between 60 and 100 parts. The solid asphalt is used in an amount between 20 and 80 parts, and preferably between 35 and 55 parts. The term "parts" herein refers to parts by weight per 100 parts of the rubber polymer(s) in the mix. The laminar particles of hydrous magnesium silicate have the following characteristics:

Hydrous magnesium silicate, percent _____ 95–99
Free moisture, percent _____ 0.1–0.3
Magnetizable iron _____ Nil
Salts of heavy metals deleterious to rubber _____ Nil
Approximate maximum particle size (microns) _____ 15
Preferred maximum _____ 8
Approximate specific surface m.$^2$/g. _____ 10–20
Specific gravity _____ 2.75–2.80
Index of refraction (mean) _____ about 1.59

The solid asphalt is a solid residue of petroleum refinery operations, such as a bottom residue of crude petroleum oil distillation, essentially hydrocarbon in nature, having a wide molecular weight distribution, ranging from molecular weights in excess of two million to weights of less than one thousand. Such asphalts are very hard materials below 0° C., and are solids at room temperature, but gradually soften as the temperature goes up, until they are readily pourable at 200° C. and up. The solid asphalts suitable for use in this invention should have a softening point of from about 70° F. to about 115° F., preferably 90° F. to 105° F., as measured by the standard ring and ball method (ASTM:D 36–26). It is also important that the asphaltene content be low. The asphaltene content is defined as the fraction of the asphalt insoluble in n-pentane or 88° petroleum naphtha as determined by conventional methods. The flash point of the suitable solid asphalts (Cleveland Open Cup Method) is preferably within the range of from about 500° F. to about 575° F. The specific gravity of the solid asphalt is preferably about 1.00±0.02.

The rubbers having the improved air retention characteristics are butadiene-styrene copolymers containing from about 10% to about 60%, and preferably from about 20% to about 45% bound styrene. The rubber employed may be of the unextended kind, or of the oil-extended kind. The oils can be of the aromatic or the naphthenic type currently used in rubber processing. In addition, plasticizers may be selected from those oils including low molecular weight polymer oils, vegetable oils, pine tar oils and mineral oil. The improved styrene-butadiene rubber of this invention may be admixed with such compatible rubbers as natural rubber and polybutadiene, to produce rubber materials having the improved air retention characteristics. The mix may also contain other desired conventional compounding ingredients in conventional amounts including such materials as vulcanizing agents, accelerators, anti-ozonants and anti-oxidants, softeners or processing aids, plasticizers, etc. Carbon black can be added to the rubber in quantities varying from ten to twenty parts, and may be incorporated into the rubber in the latex form to insure uniform dispersion. The carbon black may be a high abrasion furnace black (HAF), super abrasion furnace black (SAF) high modulus furnace black, reinforcing furnace black (RF), or very fine furnace black (VFF), to name a few. The rubber mix may be mixed in conventional mixing equipment such as internal mixers or open roll mills. The addition of the hydrous magnesium silicate particles is preferably made at the mixing mills. Alternatively, it may be added to the rubber latex after polymerization has been completed. The asphalt may also be added at the mixing mills, or in an emulsified state to the latex mix. The resultant mixture may then be coagulated, washed and dried in the normal manufacturing system, producing a rubber crumb in an easily handled form. The mix is vulcanized by treatment at elevated temperatures, preferably at 292° F. for a period of 25 to 100 minutes. Cures can be obtained at higher temperatures without adversely affecting the rubber by exposure for shorter periods of time.

For the purpose of further explaining the invention to those skilled in the art, the following illustrative examples are given:

In each of the examples, a rubber was prepared from a mix having 100 parts of the styrene-butadiene rubber copolymer, 5 parts of zinc oxide, 1.5 parts of stearic acid, 2 parts of sulfur, 2 parts of benzothiazolyl disulfide and 3 parts of diethylene glycol. The air retention measurements were made on a commercially available instrument, "Air Permeability Apparatus," Catalog No. 9–B302 and 9–B304, essentially a diffusion cell, manufactured by the American Instrument Company, Inc., Silver Spring, Maryland. This apparatus is described as an instrument designed to accurately measure the amount and/or rate of air or gas absorption of various polymeric speciments. A compound according to the prescribed formula was mixed on a conventional rubber mixing machine and vulcanized into slabs of 6 x 6 x .030 inches; circular test pieces of 5-inch diameter were prepared. The test sample was inserted into a diffusion cell, constructed of two circular recessed stainless steel plates. The test is usually conducted at a regulated temperature of 30° C. with a constant pressure of 48 p.s.i. on one side of the rubber membrane and atmospheric pressure on the other. A manometer which permits readings to be made at atmospheric pressure is connected to the diffusion cell. The volume increase of air on the atmospheric side of the membrane is measured after a prescribed length of time. The air permeability is defined as the number of cubic feet of air at 32° F. and 29.92 inches of mercury diffusing through 0.001 inch thickness of polymer under a pressure differential of 1 pound per square inch per square foot of polymer per day.

| Example | Percent styrene in rubber | Asphalt, parts | Magnesium silicate particle, parts | Air permeability ×10⁴ |
|---------|---------------------------|----------------|------------------------------------|------------------------|
| 1       | 10                        | 50             | 82.5                               | 8.9                    |
| 2       | 23.5                      | 50             | 82.5                               | 3.2                    |
| 3       | 40                        | 37.5           | 82.5                               | 2.3                    |
| 4       | 44                        | 50             | 82.5                               | 2.7                    |

The styrene-butadiene rubbers prepared in accordance with the present invention and incorporating the laminar particles of hydrous magnesium silicate, together with a solid asphalt, are particularly useful in fabricating inner tubes for tires and also for use in fabricating tubeless tires. They exhibit air retention properties substantially superior to those of standard styrene-butadiene rubbers and almost equivalent to butyl rubber. This improvement is obtained without adversely affecting other physical properties such as tensile, tear strength, and flex-cracking properties. These rubbers are easily worked and relatively inexpensive as compared with the butyl rubbers largely used heretofore.

As many embodiments of this invention may be made without departing from the spirit and scope thereof, it is to be understood that the invention includes all such modifications and variations as come within the scope of the appended claims.

What is claimed is:
1. A rubber composition consisting essentially of
   (i) 100 parts by weight of a styrene-butadiene copolymer having between 10% and 60% by weight of styrene,
   (ii) between 20 parts and 80 parts of solid asphalt having a ring and ball softening point between 70° F. and 115° F., and
   (iii) between 40 parts and 140 parts of laminar particles of hydrous magnesium silicate having the following characteristics

Hydrous magnesium silicate, percent ____ 95–99
   Free moisture, percent _____ 0.1–0.3
   Magnetizable iron _____ Nil
   Salts of heavy metals deleterious to rubber __ Nil
   Approximate maximum particle size, microns _ 15
   Approximate specific surface, m.²/g. ____ 10–20
   Index of refraction (mean) _____ about 1.59

2. The composition of claim 1 containing between 60 parts and 100 parts of said hydrous magnesium silicate.
3. The composition of claim 1 containing between 35 parts and 55 parts of said solid asphalt.
4. The composition of claim 3 containing between 60 parts and 100 parts of said hydrous magnesium silicate.
5. A rubber composition consisting essentially of
   (i) 100 parts by weight of a styrene-butadiene copolymer having between 20% and 45% by weight of styrene
   (ii) between 20 parts and 80 parts of solid asphalt having a ring and ball softening point between 70° F. and 115° F., and
   (iii) between 40 parts and 140 parts of laminar particles of hydrous magnesium silicate having the following characteristics Hydrous magnesium silicate, percent ____ 95–99
   Free moisture, percent _____ 0.1–0.3
   Magnetizable iron _____ Nil
   Salts of heavy metals deleterious to rubber __ Nil
   Approximate maximum particle size, microns _ 15
   Approximate specific surface, m.²/g. ____ 10–20
   Specific gravity _____ 2.75–2.8
   Index of refraction (mean) _____ about 1.59

6. The composition of claim 5 containing between 60 parts and 100 parts of said hydrous magnesium silicate.
7. The composition of claim 5 containing between 35 parts and 55 parts of said solid asphalt.
8. The composition of claim 7 containing between 60 parts and 100 parts of said hydrous magnesium silicate.
9. A tubeless pneumatic tire having good air retention properties having at least one continuous layer of said tire prepared from the rubber composition of claim 1.
10. A tubeless pneumatic tire having good air retention properties having at least one continuous layer of said tire prepared from the rubber composition of claim 8.
11. An inner pneumatic tube for tires having good air retention properties prepared from the rubber composition of claim 1.
12. An inner pneumatic tube for tires having good air retention properties prepared from the rubber composition of claim 8.

References Cited by the Examiner

UNITED STATES PATENTS

| | | | |
|---|---|---|---|
| 2,648,644 | 8/1953 | McMillan et al. | 260—28.5 |
| 2,700,655 | 1/1955 | Endres et al. | 260—28.5 |
| 2,807,596 | 9/1957 | Flickinger | 260—28.5 |
| 2,964,083 | 12/1960 | Pfau et al. | 152—330 |

MORRIS LIEBMAN, *Primary Examiner.*